US009507498B2

(12) United States Patent
Bickel et al.

(10) Patent No.: US 9,507,498 B2
(45) Date of Patent: Nov. 29, 2016

(54) METHOD AND APPARATUS FOR DISCOVERING SIMILAR CONTENT OR SEARCH RESULTS

(75) Inventors: Steffen Bickel, Nidderau (DE); Boris Anthony Grunikewicz, Berlin (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 200 days.

(21) Appl. No.: 13/099,657

(22) Filed: May 3, 2011

(65) Prior Publication Data

US 2012/0254798 A1    Oct. 4, 2012

Related U.S. Application Data

(60) Provisional application No. 61/470,307, filed on Mar. 31, 2011.

(51) Int. Cl.
*G06F 3/048* (2013.01)
*G06F 3/0484* (2013.01)
*G06F 3/0488* (2013.01)
*G06F 3/0482* (2013.01)
(Continued)

(52) U.S. Cl.
CPC .......... *G06F 3/0484* (2013.01); *G06F 3/0482* (2013.01); *G06F 3/04886* (2013.01); *G06F 17/30646* (2013.01); *G06F 17/30867* (2013.01); *G06Q 30/0259* (2013.01); *G06Q 30/0261* (2013.01); *G06Q 30/0271* (2013.01)

(58) Field of Classification Search
CPC .......... G01C 21/3664; G01C 21/3667; G01C 21/367; G01C 21/3673; G01C 21/3679; G01C 21/3682; H04L 51/20; H04L 51/32; H04L 51/36; H04L 12/5865; H04L 12/588; H04L 12/589; G06F 17/3087

USPC .......................................... 715/817
See application file for complete search history.

(56) References Cited

U.S. PATENT DOCUMENTS 7,769,771 B2     8/2010   Ikeda
8,843,850 B2 *   9/2014   Barros .............. G06F 17/30241
                                                          715/810
2008/0010262 A1  1/2008   Frank
(Continued)

FOREIGN PATENT DOCUMENTS

JP      2011-34254 A         2/2011
WO   WO 2011011398 A2 *      1/2011
WO   WO 2011/077889 A1       6/2011

OTHER PUBLICATIONS

"How do I refine my search results?" Yahoo Help Article, Jul. 28, 2011, pp. 1-2.
(Continued)

*Primary Examiner* — Tuyetlien T Tran
*Assistant Examiner* — Patrick Ramsey
(74) *Attorney, Agent, or Firm* — Ditthavong & Steiner, P.C.

(57) ABSTRACT

An approach is provided for discovering similar content or search results. The discovery platform causes, at least in part, presentation of one or more results. Next, the discovery platform receives an input for selecting at least one of the one or more results. Then, the discovery platform process and/or facilitate a processing of the input to determine one or more criteria associated with the at least one of the one or more results. Additionally, the discovery platform causes, at least in part, presentation of one or more other results based, at least in part, on the one or more criteria.

20 Claims, 13 Drawing Sheets

(51) Int. Cl.
*G06F 17/30* (2006.01)
*G06Q 30/02* (2012.01)

(56) References Cited

U.S. PATENT DOCUMENTS

| | | | |
|---|---|---|---|
| 2008/0126476 A1* | 5/2008 | Nicholas et al. | 709/203 |
| 2008/0306826 A1* | 12/2008 | Kramer et al. | 705/14 |
| 2009/0012955 A1* | 1/2009 | Chu et al. | 707/5 |
| 2009/0077496 A1 | 3/2009 | Aravamudan et al. | |
| 2009/0132941 A1* | 5/2009 | Pilskalns et al. | 715/764 |
| 2009/0234815 A1* | 9/2009 | Boerries et al. | 707/3 |
| 2009/0319181 A1* | 12/2009 | Khosravy et al. | 701/208 |
| 2010/0030740 A1* | 2/2010 | Higgins et al. | 707/3 |
| 2010/0046842 A1 | 2/2010 | Conwell | |
| 2010/0114872 A1 | 5/2010 | Gupta | |
| 2010/0114873 A1 | 5/2010 | Gupta | |
| 2010/0114875 A1 | 5/2010 | Fuchs | |
| 2010/0115407 A1* | 5/2010 | Kim et al. | 715/708 |
| 2010/0198814 A1* | 8/2010 | Petersen et al. | 707/722 |
| 2011/0093458 A1 | 4/2011 | Zheng et al. | |
| 2011/0119293 A1 | 5/2011 | Taylor et al. | |
| 2011/0131235 A1 | 6/2011 | Petrou et al. | |
| 2011/0193788 A1* | 8/2011 | King et al. | 345/173 |
| 2011/0238762 A1* | 9/2011 | Soni et al. | 709/206 |
| 2012/0166281 A1* | 6/2012 | Sartipi | 705/14.54 |

OTHER PUBLICATIONS

Patsnap Website, www.patsnap.com, accessed Sep. 2, 2011.

* cited by examiner

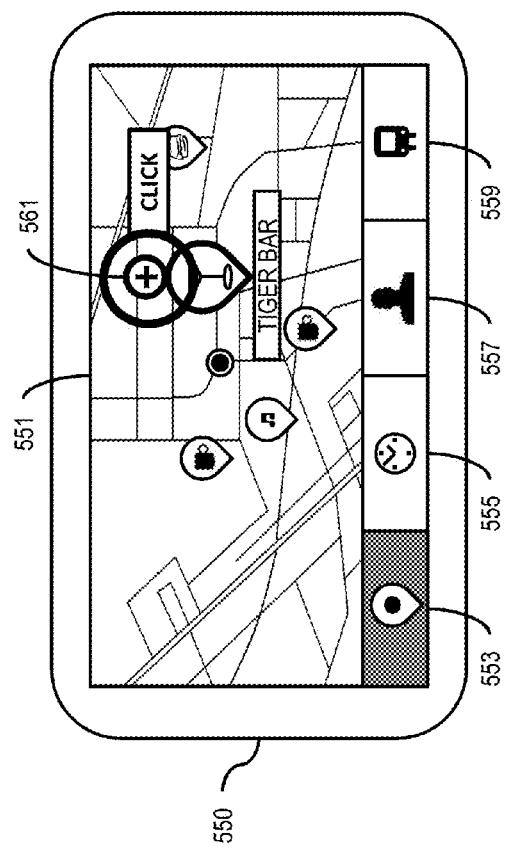
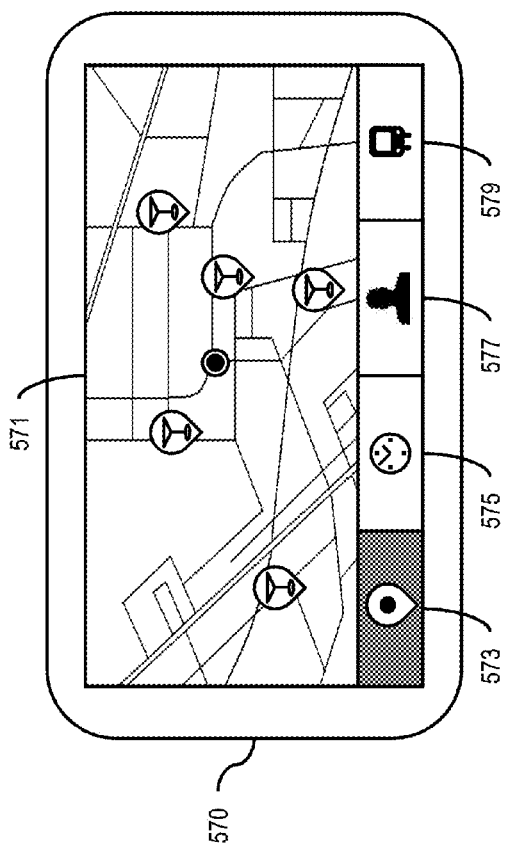
FIG. 5C
FIG. 5D

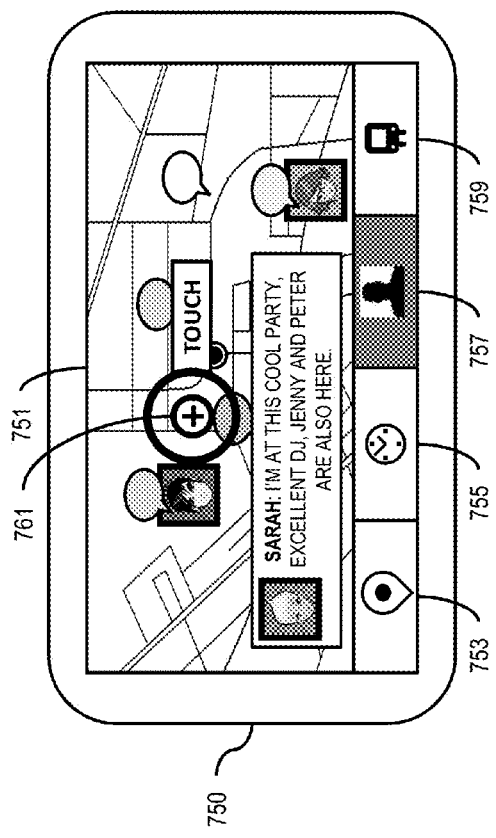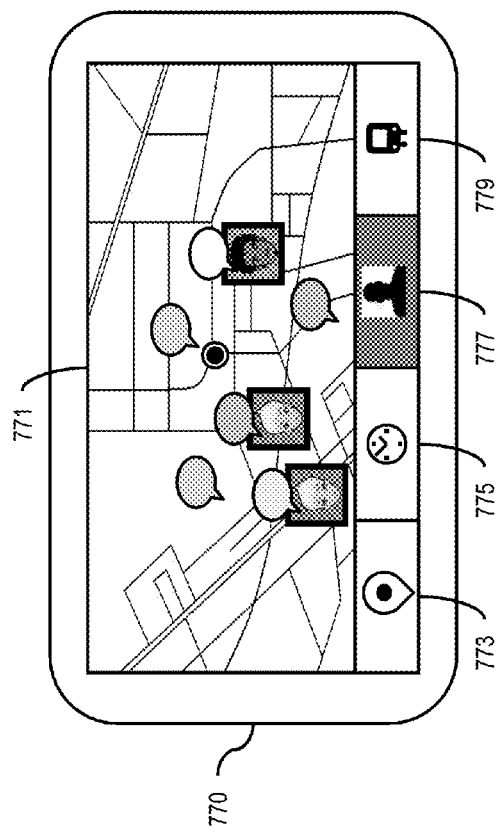
FIG. 7C
FIG. 7D

METHOD AND APPARATUS FOR DISCOVERING SIMILAR CONTENT OR SEARCH RESULTS

RELATED APPLICATIONS

This application claims the benefit of the earlier filing date under 35 U.S.C. §119(e) of U.S. Provisional Application Ser. No. 61/470,307 filed on Mar. 31, 2011, entitled "Method and Apparatus for Discovering Similar Content or Search Results," the entirety of which is incorporated herein by reference.

BACKGROUND

Service providers and device manufacturers (e.g., wireless, cellular, etc.) are continually challenged to deliver value and convenience to consumers by, for example, providing compelling network services. One area of interest has been the development of finding and accessing desired content or search results. Traditionally, users would locate content by forging through folders, files, links, etc., or by typing terms associated with the content into a search engine via, for instance, a keyboard. However, such traditionally methods may be time consuming and troublesome, especially if users are not exactly sure what they are looking for. Although these issues exist with respect to non-mobile devices, such issues are amplified when it comes to finding desired content or search results using mobile devices. For example, although mobile devices are now equipped with touch capabilities, voice-enabled commands, qwerty keyboards, etc., to enable easier methods of entering information or commands, mobile device input capabilities are still very limited in comparison to the capabilities of non-mobile devices.

SOME EXAMPLE EMBODIMENTS

Therefore, there is a need for an approach for effectively discovering similar content or search results.

According to one embodiment, a method comprises causing, at least in part, presentation of one or more results. The method also comprises receiving an input for selecting at least one of the one or more results. The method further comprises processing and/or facilitating a processing of the input to determine one or more criteria associated with the at least one of the one or more results. The method additionally comprises causing, at least in part, presentation of one or more other results based, at least in part, on the one or more criteria.

According to another embodiment, an apparatus comprises at least one processor, and at least one memory including computer program code, the at least one memory and the computer program code configured to, with the at least one processor, cause, at least in part, the apparatus to present one or more results. The apparatus is also caused to receive an input for selecting at least one of the one or more results. The apparatus is further caused to process and/or facilitate a processing of the input to determine one or more criteria associated with the at least one of the one or more results. The apparatus is additionally caused to present one or more other results based, at least in part, on the one or more criteria.

According to another embodiment, a computer-readable storage medium carries one or more sequences of one or more instructions which, when executed by one or more processors, cause, at least in part, an apparatus to present one or more results. The apparatus is also caused to receive an input for selecting at least one of the one or more results. The apparatus is further caused to process and/or facilitate a processing of the input to determine one or more criteria associated with the at least one of the one or more results. The apparatus is additionally caused to present one or more other results based, at least in part, on the one or more criteria.

According to another embodiment, an apparatus comprises means for causing, at least in part, presentation of one or more results. The apparatus also comprises means for receiving an input for selecting at least one of the one or more results. The apparatus further comprises means for processing and/or facilitating a processing of the input to determine one or more criteria associated with the at least one of the one or more results. The apparatus additionally comprises means for causing, at least in part, presentation of one or more other results based, at least in part, on the one or more criteria.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 5A-5D are diagrams of user interfaces utilized to discover similar places in the processes of FIGS. 3 and 4, according to various embodiments;

FIGS. 7A-7D are diagrams of user interfaces utilized to discover similar feeds in the processes of FIGS. 3 and 4, according to various embodiments;

DESCRIPTION OF SOME EMBODIMENTS

Examples of a method, apparatus, and computer program for discovering similar content or search results are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although various embodiments are described with respect to a location-based display and/or a location-based service, it is contemplated that the approach described herein may be used with other displays and/or services.

Figure 1:
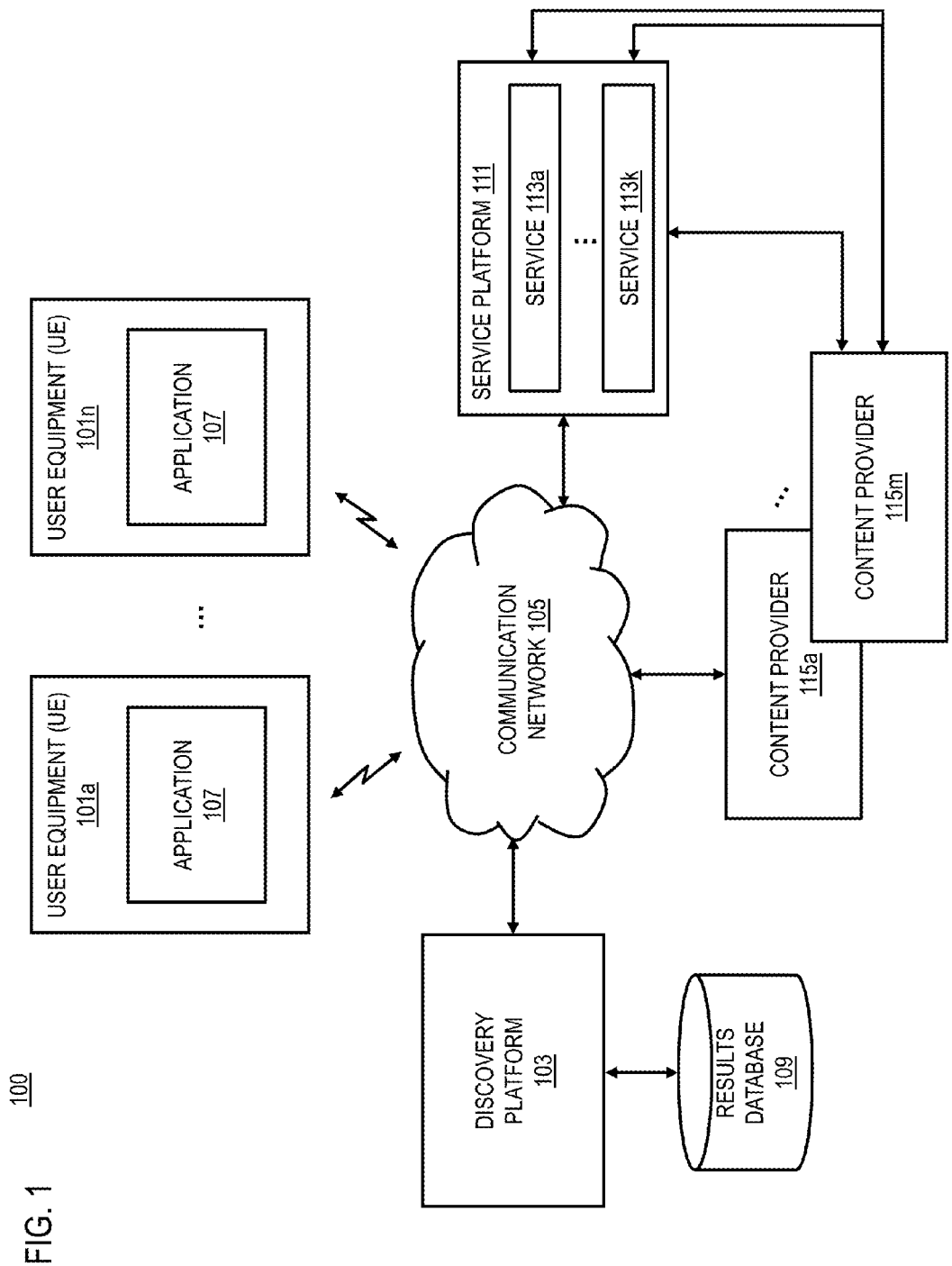
FIG. 1 is a diagram of a system capable of discovering similar content or search results, according to one embodiment.

FIG. 1 is a diagram of a system capable of discovering similar content or search results, according to one embodiment. As mentioned, users traditionally located content by forging through folders, files, links, etc., or by typing terms associated with the content into a search engine via, for instance, a keyboard. However, these traditionally methods can be particularly cumbersome and time consuming, especially in instances where users are not exactly sure what they are looking for or where users are not familiar with particular terms necessary to find relevant results. Although these issues can be especially troublesome for users of any device, such issues are amplified when it comes to finding desired content or search results using mobile devices. For example, although mobile devices are now equipped with touch capabilities, voice-enabled commands, qwerty keyboards, etc., to enable easier methods of entering information or commands, mobile device input capabilities are still very limited in comparison to the capabilities of non-mobile devices. Mobile devices, for instance, have smaller keyboards, smaller display and resolution size, less processing power and resources, etc., compared to desktops, servers, etc.

To address this problem, a system 100 of FIG. 1 introduces the capability to provide users with similar content or search results associated with, for instance, selected content or search results. Specifically, the system 100 may present more (or new) results based on some criteria associated with a result from previously presented results. By way of example, the system 100 may determine the criteria by processing an input received for selecting the result from the previously presented results. The results may, for instance, include location-based features (e.g., points of interest (POIs)), events, advertisements, recommendations, feeds (e.g., news feed, social feed, etc.), or any other results. Moreover, the results may be presented on a location-based display, such as an augmented reality display, a mixed reality display, a virtual reality display, a mapping display, a navigation display, or any other location-based displays.

In one scenario, a set of diverse results may initially be presented. As an example, the results may include an Italian restaurant, a downtown cinema, a local bar, a music store, etc. A user looking to find more restaurants may, for instance, select the Italian restaurant. As such, an input for selecting the Italian restaurant may be received and subsequently processed to determine some criteria associated with the Italian restaurant (e.g., must be a restaurant within 200 units of the user). Based on the criteria, a new set of results may be presented to the user. In this case, the new set of results may, for instance, one or more restaurants, such as the Italian restaurant, a French restaurant, a family restaurant, a Chinese restaurant, etc.

In another scenario, a user may be driving in a vehicle with a navigation display. As such, a set of diverse results may be presented to a user on the navigation display. Because the user is on the road, the results may, for instance, include a fast food restaurant, an eat-in restaurant, a fueling station, a café, etc. If, for instance, the user is looking for a particular gas station nearby, the user may choose to select the fueling station (e.g., represented by a fueling station icon). In this example, the user may make such a selection, or any other selection, in a number of ways, such as tapping the fueling station icon, pressing and holding the fueling station icon, speaking into a microphone, etc. Based on the selection, the user may then be presented with results for one or more fueling station stations (e.g., represented by text, icons, etc.), such as nearby gas stations (e.g., represented by a gas icon), nearby diesel stations (represented by a diesel icon), etc. To further refine the results to locate the particular nearby gas station, the user may select one of the nearby gas stations, for instance, by tapping one of the gas icons. As such, the user may then be presented with results for gas stations, including gas stations that may not have previously been presented to the user. The presentation of the results may also include further details about the nearby gas stations, such as the name of the gas station, the price of gas at the station, etc., to enable the user to locate the particular gas station that the user is looking for.

In certain embodiments, a user interface object associated with a particular result of the displayed results may be presented. As an example, the user interface object may appear next to (or near) the associated result based on a default setting, a user-defined setting, context information (e.g., time, place, etc.), previous selections by the user or other users, a user action (e.g., scrolling or hovering over the associated result), etc. Accordingly, in certain other embodiments, the input for selecting the particular result may be based on a selection of the user interface object. By way of example, if a user selects a user interface object associated with a particular result (e.g., by tapping, by pressing and holding, by clicking, etc.), the input may indicate that the user wishes to see results related to the particular result. As such, the input may include some criteria associated with the particular result based on the selection of the user interface object. In one use case, for instance, the selection of a plus symbol (e.g., "+") next to a restaurant icon representing a nearby Italian restaurant on a navigation display will produce other restaurant icons representing other nearby restaurants on the navigation display.

In particular embodiments, the results may be based on a hierarchy of results determined by processing a data set, such as a content data set, a search log data set, an access log data set, etc. In one scenario, a first level group of the hierarchy may include an initial set of results to be presented to the user. If it is desired to initially present a user with a diverse set of results, the results in the first level group of the hierarchy may, for instance, be determined by processing the data set for different categories associated with results in the data set. In addition, in this example, the results selected to be included in the first level group may be the highest occurring results with respect to each of the different categories in the data set. Furthermore, because of limitations associated with displaying results (e.g., resolution size, screen size, etc.), the initial set of results may, for instance, only include results associated with the most popular categories (e.g., ratings, frequency of access or use, etc.). As such, one way to provide the user with a diverse set of results at the outset may be to initially present the user with a result from each of the most popular categories (e.g., an Italian restaurant, an oldies music store, a "Brand X" gas station, etc.).

In another scenario, one or more second level groups of the hierarchy may include results to be presented to the user in response to a selection of a result associated with the first level group of the hierarchy. Each of the second level groups may, for instance, be associated with a respective category associated with the first level group. Moreover, in this example, each of the second level groups may include results associated with sub-categories of the respective category associated with the first level group. It is noted that the first level group and/or second level groups may not necessarily be exclusive of one another. For example, results that may be associated with one second level group may also be associated with another second level group. Additionally, results that may be associated with a second level group may also be associated with a first level group.

In particular other embodiments, indicators relating to a status associated with the results may be presented. The status may, for instance, include a mood, an age, a start time, an end time, etc., associated with the results. By way of example, a diverse set of results relating to advertisements may be presented to the user. In one scenario, the presentation of the advertisement results may also contain indicators to demonstrate the advertisement's age. If the advertisement results are represented by icons and/or tiles, the icons and/or tiles may, for instance, be outlined in green for an advertisement that was recently posted, yellow for an advertisement that has been posted for a while, or red for an advertisement that will expire soon. In this way, users may be able to quickly prioritize which advertisement to view based on the advertisement's age (e.g., to avoid missing out on a deal).

In another scenario, the presentation of the advertisement results may also contain indicators to demonstrate the mood associated with the advertisement. For example, users often rate content items, for instance, through a number system (e.g., ranging from 1 for "very unhappy" to 5 for "very happy"). As such, an advertisement result may contain a number (e.g., 1 through 5) to indicate how users feel about the particular advertisement (e.g., "a terrible deal", "an average deal", "a great deal", etc.). In this way, users may be able to efficiently analyze which advertisements may be of interest to them.

In various embodiments, the results may be based on a determination of a history associated with one or more users. The history may, for instance, include previous selections of the user interface object, previous selections of results, etc. As an example, an initial set of results presented to the user may be based on some criteria associated with results that the user or other users have previously selected. As such, if the criteria include categories, the initial set of results may, for instance, only contain results associated with the most frequent categories selected by the user, users with interests similar to the user, etc. As another example, other results presented in response to a user selection of a result from the initial set may also be based on some criteria associated with results that the user or other users have previously selected. Thus, in the situation where the user has only ever selected "Brand X" gas stations, "Brand X" gas stations may, for instance, be prioritized over other fueling stations when the user opts to search for nearby fueling stations from the initial set of results.

In various other embodiments, the results may be based on a determination of context information associated with the device, a user of the device, etc. In the context of news or social feeds, for instance, it may be important to the user to be aware of things that may be occurring near the user's hometown and the user's current location. Thus, in one scenario, feeds that are near the user's hometown or the user's current location (e.g., the device's current location) may have priority over other feeds in presenting the feed results to the user. Also, in the context of POIs, it may be important to the user that the POI is currently opened or accessible by the user. As such, in one instance, a user that is looking for a restaurant may choose to be presented with only restaurants that are currently opened.

More specifically, the system 100 may cause, at least in part, presentation of one or more results, for instance, to a user. The system 100 may then receive an input for selecting at least one of the one or more results. By way of example, the input may be based on a selection of the at least one of the one or more results by the user. The system 100 may further process or facilitate a processing of the input to determine one or more criteria associated with the at least one of the one or more results. The system 100 may additionally cause, at least in part, presentation of one or more other results based, at least in part, on the one or more criteria. As mentioned, the one or more results and/or the one or more other results may, for instance, be associated with one or more location-based features (e.g., POIs), one or more events, one or more advertisements, one or more recommendations, one or more feeds (e.g., news feed, social feed, etc.), or any other results. Moreover, the one or more results and/or the one or more results may, for instance, be presented on a location-based display, such as an augmented reality display, a mixed reality display, a virtual reality display, a mapping display, navigation display, or any other location-based display.

As shown in FIG. 1, the system 100 comprises a user equipment (UE) 101 or multiple UEs 101 (or UEs 101a-101n) having connectivity to a discovery platform 103 via a communication network 105. The UE 101 may include and have access to an application 107 to enable the UE 101 to interact with, for instance, the discovery platform 103 to ascertain similar content or search results. The discovery platform 103 may include or have access to a results database 109 to provide the one or more results and/or the one or more other results to the UE 101. By way of example, the results database 109 may include content associated with the one or more results and/or the one or more other results. Alternatively, or additionally, the results database 109 may include one or more links to access or obtain content. The content may, for instance, be provided by a service platform 111, one or more services 113 (or services 113a-113k), one or more content providers 115 (or content providers 115a-115m), and/or other services available over the communication network 105. For example, a particular service 113 (e.g., a music or video service) may obtain content (e.g., media content) from a particular content provider 115 to offer the content to the UE 101. Accordingly, the link may be an address or some other identifier that points to a memory or storage location associated with the service platform 111, the services 113, and/or the content providers 115.

By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

In another embodiment, the discovery platform 103 may cause presentation of at least one user interface object associated with the at least one of the one or more results, wherein the input is based on a selection of the at least one user interface object by a user of the device. As provided, the at least one user interface object may be presented based on a default setting, a user-defined setting, context information (e.g., time, place, etc.), previous selections by the user or other users, a user action (e.g., scrolling or hovering over the at least one of the one or more results), etc. By selecting the at least one user interface object associated with the at least one of the one or more results, the user may, for instance, cause the input to indicate that that user wishes to see more results related (e.g., based on the one or more criteria) to the at least one of the one or more results.

In another embodiment, the discovery platform 103 may process and/or facilitate a processing of at least one data set to determine a hierarchy of results, wherein the one or more results, and/or the one or more other results are based on the hierarchy. As mentioned, the at least one data set may, for instance, be at least one content data set, at least one search log data set, at least one access data set, etc. As described, the one or more results and/or the one or more other results may be presented based on one or more hierarchical groups (e.g., one or more first level groups, one or more second level groups, one or more third level groups, etc.) that the one or more results and/or the one or more other results are associated with.

In another embodiment, the discovery platform 103 may cause presentation of one or more indicators, wherein the one or more indicators relate to at least one status associated with the one or more results, and/or the one or more other results. The at least one status may, for instance, include a mood, an age, a start time, and/or an end time associated with the one or more results and/or the one or more other results. As explained, the at least one status may be able to provide users with additional information about the one or more results and/or the one or more other results that may, for instance, assist the users in prioritizing their access or selection of the one or more results and/or the one or more other results. By way of example, a presentation of one or more advertisement results may include one or more indicators that demonstrate the remaining duration and the quality of advertised deals.

In another embodiment, the discovery platform 103 may determine a history associated with one or more users, wherein the one or more results, and/or the one or more other results are based on the history. The history may, for instance, include one or more previous selections of the at least one user interface object, the at least one of the one or more results, and/or at least one of the one or more other results. In the context of books, for instance, the one or more criteria may include genres, authors, etc. In one scenario, the one or more results presented may include results associated with the most popular genres (e.g., most frequently selected by the one or more users, highest rating by the one or more users, etc.). In another scenario, the one or more other results presented may include results associated with the most popular authors of a genre associated with the at least one of the one or more results.

In another embodiment, the discovery platform 103 may determine context information associated with the device and/or a user of the device, wherein the one or more results, and/or the one or more other results are based on the context information. As mentioned, it may be important to a user, for instance, to be provided with results based on a location, time, etc., associated with the user or the user's device. Thus, in one use case with respect to restaurants, the user may only be presented with restaurants currently opened for business that are also within a certain distance from the user's current or designated location (e.g., hometown).

By way of example, the UE 101, the discovery platform 103, the service platform 111, and the content providers 115 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
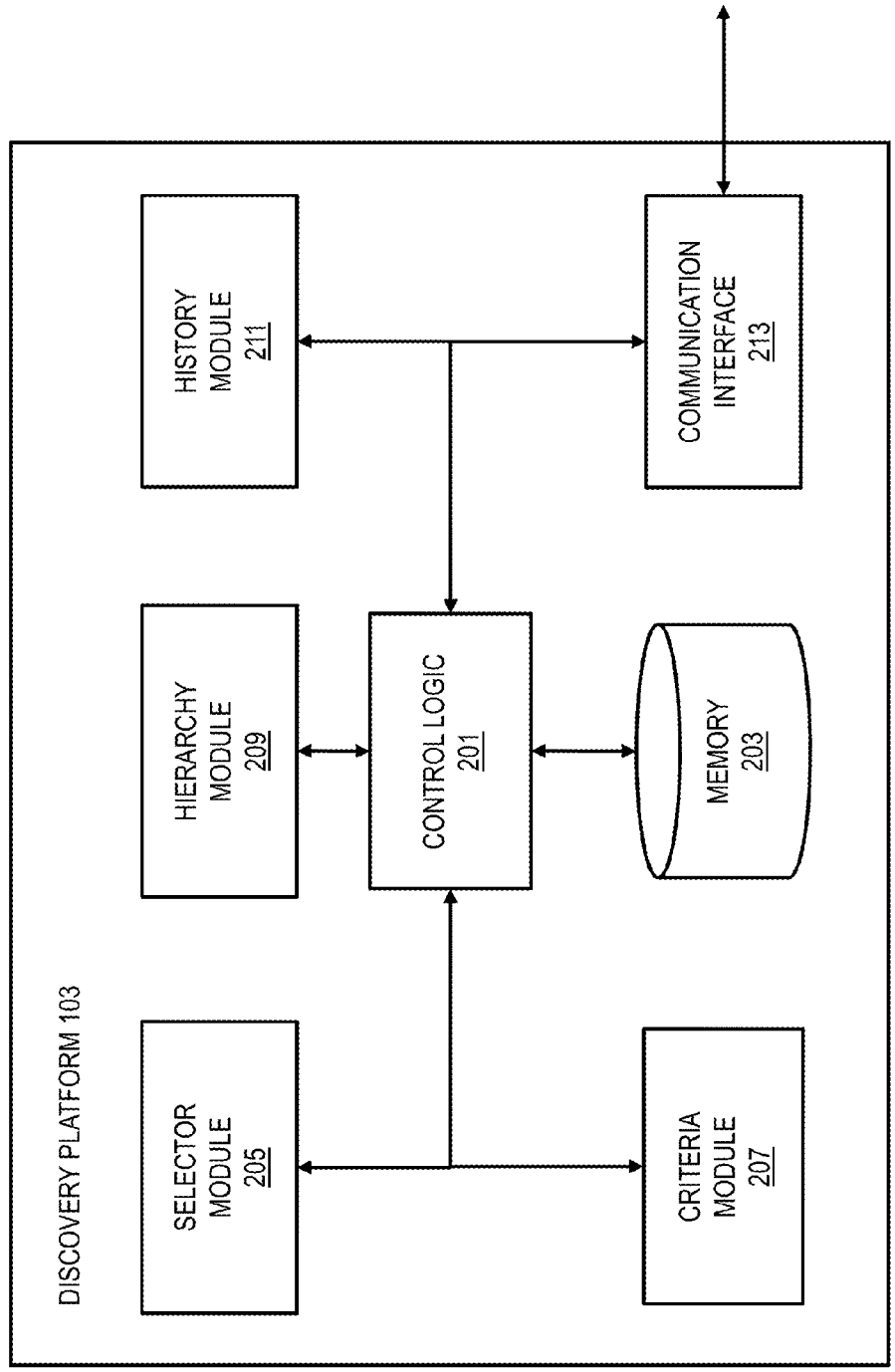
FIG. 2 is a diagram of the components of a discovery platform, according to one embodiment.

FIG. 2 is a diagram of the components of a discovery platform, according to one embodiment. By way of example, the discovery platform 103 includes one or more components for providing discovery of similar content or search results. It is contemplated that the functions of these components may be combined in one or more components or performed by other components of equivalent functionality. In this embodiment, the discovery platform 103 includes control logic 201, memory 203, a selector module 205, a criteria module 207, a hierarchy module 209, a history module 211, and a communication interface 213.

The control logic 201 executes at least one algorithm for executing functions of the discovery platform 103. For example, the control logic 201 may interact with the selector module 205 to determine one or more results to be presented, for instance, to ensure that the initial results presented to the user include a wide variety of results.

The control logic 201 may also utilize the communication interface 213 to communicate with other components of the discovery platform 103, the UEs 101, the service platform 111, the content providers 115, and other components of the system 100. By way of example, the communication interface 213 may assist in receiving the input for selecting at least one of the one or more results. The communication interface 213 may further include multiple means of communication. In one use case, the communication interface 213 may be able to communicate over SMS, internet protocol, instant messaging, voice sessions (e.g., via a phone network), or other types of communication.

Next, the control logic 201 may direct the criteria module 207 to process the input to determine one or more criteria associated with the at least one of the one or more results. As a result, the selector module 205 may then be utilized to determine one or more other results to be presented based on the one or more criteria.

As mentioned, the one or more results and/or the one or more other results may be based on a hierarchy of results. As such, the control logic 201 may work with the hierarchy module 209 to process at least one data set to determine the hierarchy. Furthermore, as discussed, the one or more results and/or the one or more other results may also be based on a history associated with one or more users, such as one or more previous selections of the at least one user interface object, the at least one of the one or more results, and/or at least one of the one or more other results. Thus, the control logic 201 may also employ the history module 211 to determine the history associated with the one or more users.

Figure 3:
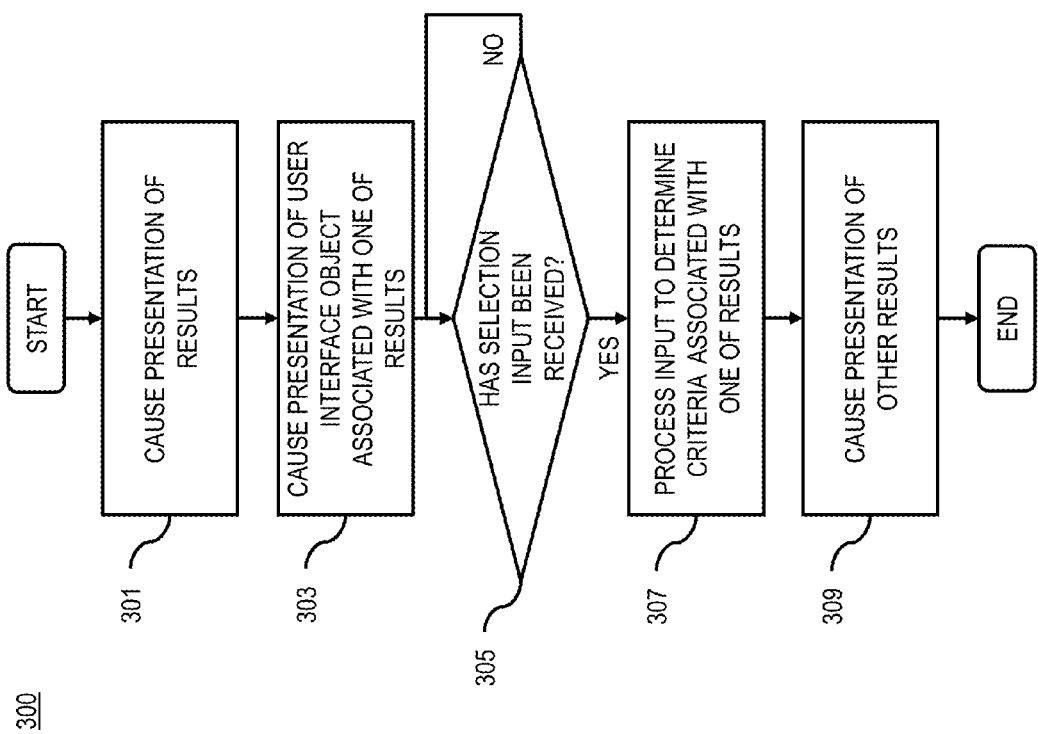
FIG. 3 is a flowchart of a process for discovering similar content or search results, according to one embodiment.
Figure 9:
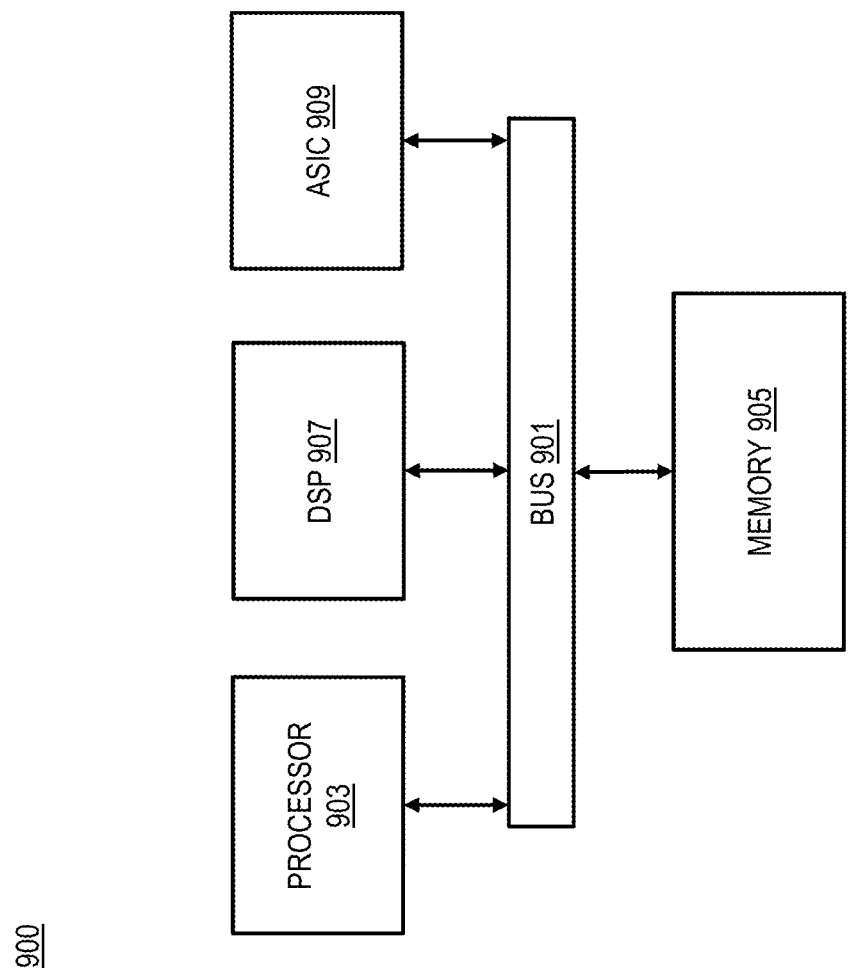
FIG. 9 is a diagram of a chip set that can be used to implement an embodiment of the invention.

FIG. 3 is a flowchart of a process for discovering similar content or search results, according to one embodiment. In one embodiment, the control logic 201 and/or other components of the discovery platform 103 performs the process 300 and is implemented in, for instance, a chip set including a processor and a memory as shown in FIG. 9. As such, the control logic 201 can provide means for accomplishing various parts of the process 300 as well as means for accomplishing other processes in conjunction with other components of the discovery platform 103.

In step 301, the control logic 201 may cause presentation of the one or more results, for instance, to a user. As mentioned, the one or more results may include a wide variety of results. Such results may, for instance, be associated with one or more location-based features (e.g., POIs), one or more events, one or more advertisements, one or more recommendations, one or more feeds (e.g., news feed, social feed, etc.), or any other results. The control logic 201 may, as in step 303, also cause presentation of at least one user interface object associated with at least one of the one or more results. As provided, the at least one user interface object may be presented based on a default setting, a user-defined setting, context information (e.g., time, place, etc.), previous selections by the user or other users, a user action (e.g., scrolling or hovering over the at least one of the one or more results), etc.

In step 305, the control logic 201 may determine whether an input for selecting at least one of the one or more results has been received. By way of example, the input may be obtained when the at least one of the one or more results and/or the at least one user interface object has been selected, for instance, by the user. If the input has been received, the control logic 201 may, as in step 307, then process and/or facilitate a processing of the input to determine one or more criteria associated with the at least one of the one or more results. In this way, the one or more criteria may, for instance, be utilized to determine results that are similar to the at least one of the one or more results. As such, in step 309, the control logic 201 may cause presentation of one or more other results based, at least in part, on the one or more criteria. Furthermore, as discussed, the one or more results and/or the one or more other results may also be based on a hierarchy of results and/or a history associated with one or more users.

Figure 4:
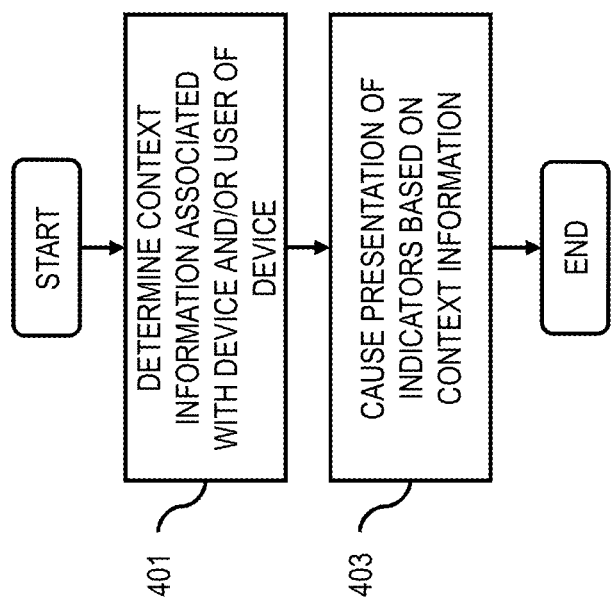
FIG. 4 is a flowchart of a process for presenting indicators associated with results, according to one embodiment.

FIG. 4 is a flowchart of a process for presenting indicators associated with results, according to one embodiment. In one embodiment, the control logic 201 and/or other components of the discovery platform 103 performs the process 400 and is implemented in, for instance, a chip set including a processor and a memory as shown in FIG. 9. As such, the control logic 201 can provide means for accomplishing various parts of the process 400 as well as means for accomplishing other processes in conjunction with other components of the discovery platform 103.

In step 401, the control logic 201 may determine context information associated with the device and/or a user of the device, wherein the one or more results and/or the one or more other results are based on the context information. As discussed, the presentation of the one or more results and/or the one or more other results may be prioritized, for instance, based on a location, time, etc., associated with the user or the user's device (e.g., only places that are currently opened and nearby).

In step 403, the control logic 201 may also cause presentation of one or more indicators, for instance, based on the context information, wherein the one or more indicators relate to at least one status associated with the one or more results and/or the one or more other results. The at least one status may, for instance, include a mood, an age, a start time, and/or an end time associated with the one or more results and/or the one or more other results. As explained, the at least one status may be able to provide users with additional information about the one or more results and/or the one or more other results that may, for instance, assist the users in prioritizing their access or selection of the one or more results and/or the one or more other results. In this example, the at least one status may, for instance, show the remaining duration of advertisements based on the current time.

Figure 5A:
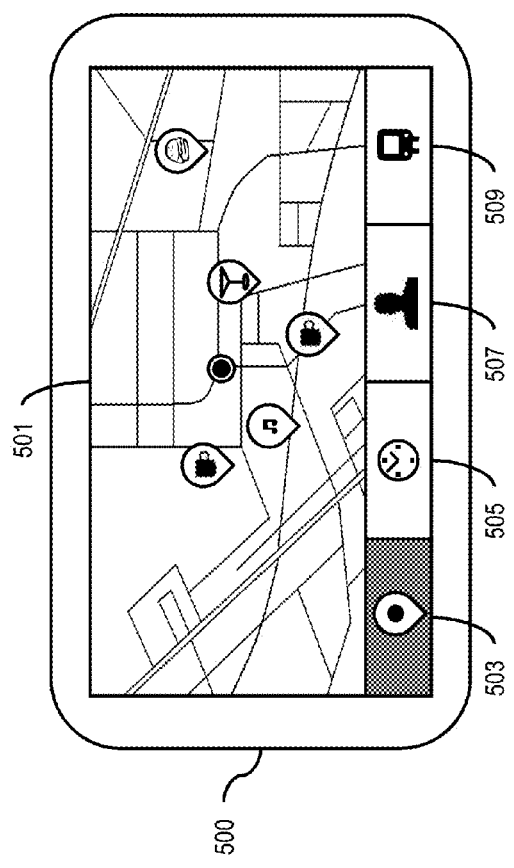
Figure 5B:
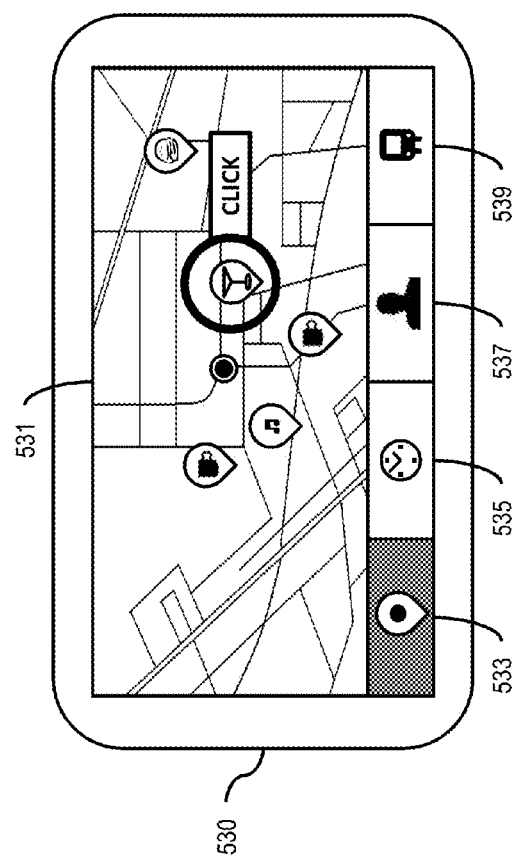

FIGS. 5A-5D are diagrams of user interfaces utilized to discover similar places in the processes of FIGS. 3 and 4, according to various embodiments. FIG. 5A illustrates a user interface 500 that features a display 501, options 503, 505, 507, and 509, and icons representing various places near the user. For example, the cup icon may represent a café, the music icon may represent a music store, the wine glass icon may represent a bar, and the burger icon may represent a fast food restaurant. As shown, option 503 has been selected to indicate that the user wishes to be presented with place results. FIG. 5B illustrates a user interface 530 that features a display 531, options 533, 535, 537, and 539, and icons representing various places near the user. As shown, the wine glass icon representing a bar has been selected (e.g., clicked by the user).

FIG. 5C illustrates a user interface 550 that features a display 551, options 553, 555, 557, and 559, a user interface object 561, and icons representing various places near the user. As shown, based on the selection of the wine glass icon in FIG. 5B, the name of the selected bar (e.g., "Tiger Bar") is displayed. Moreover, the selection of the wine glass icon in FIG. 5B, has also caused the user interface object 561 (e.g., plus symbol) to be presented next to the previously selected wine glass icon. Furthermore, as demonstrated, the user interface object 561 has been selected. FIG. 5D illustrates a user interface 570 that features a display 571, options 573, 575, 577, and 579, and icons representing various bars near the user. As shown, based on the selection of the user interface object 561 in FIG. 5C, bar icons representing several other bars near the user are presented.

Figure 6A:
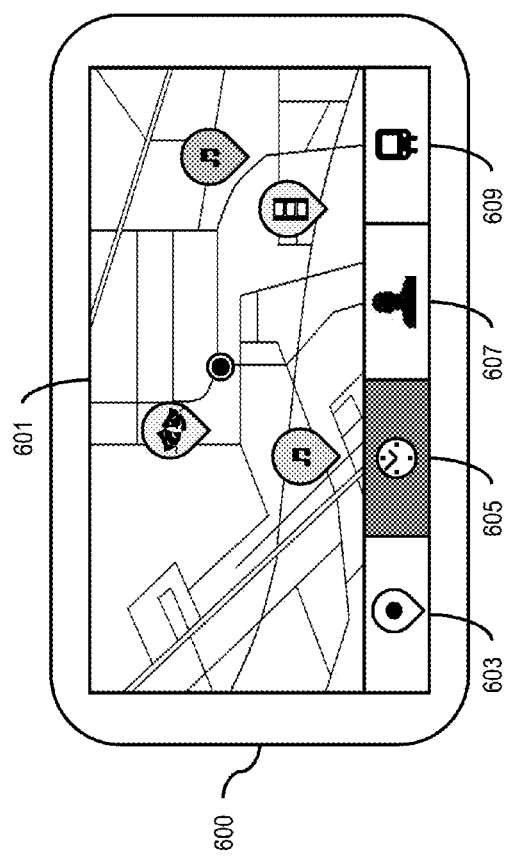
FIGS. 6A-6D are diagrams of user interfaces utilized to discover similar events in the processes of FIGS. 3 and 4, according to various embodiments.
Figure 6B:
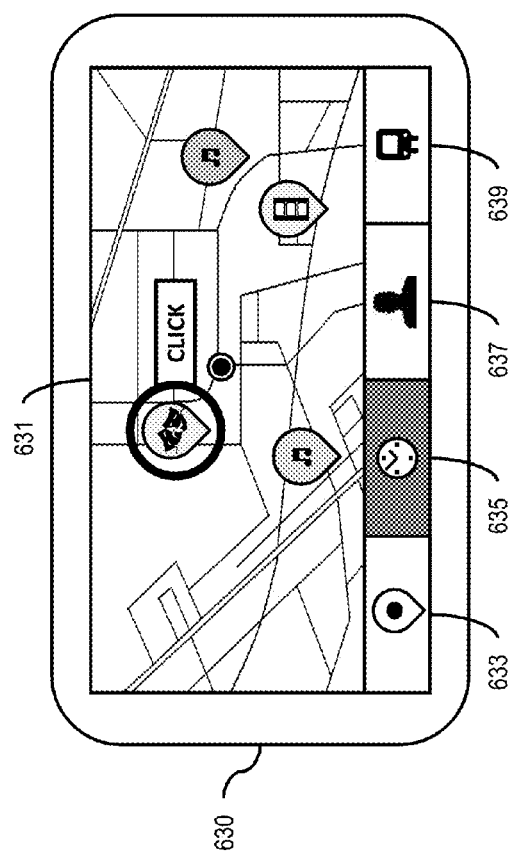

FIGS. 6A-6D are diagrams of user interfaces utilized to discover similar events in the processes of FIGS. 3 and 4, according to various embodiments. FIG. 6A illustrates a user interface 600 that features a display 601, options 603, 605, 607, and 609, and icons representing various events near the user. For example, the drama icon may represent a play, the music icon may represent a music concert, and the film icon may represent a movie. As shown, option 605 has been selected to indicate that the user wishes to be presented with event results. In addition, the various icons include indicators that may, for instance, demonstrate a start time associated with respective events (e.g., events with start times closer to the current time have icons with darker shades). FIG. 6B illustrates a user interface 630 that features a display 631, options 633, 635, 637, and 639, and icons representing various events near the user. As shown, the drama icon representing a play has been selected (e.g., clicked by the user).

Figure 6C:
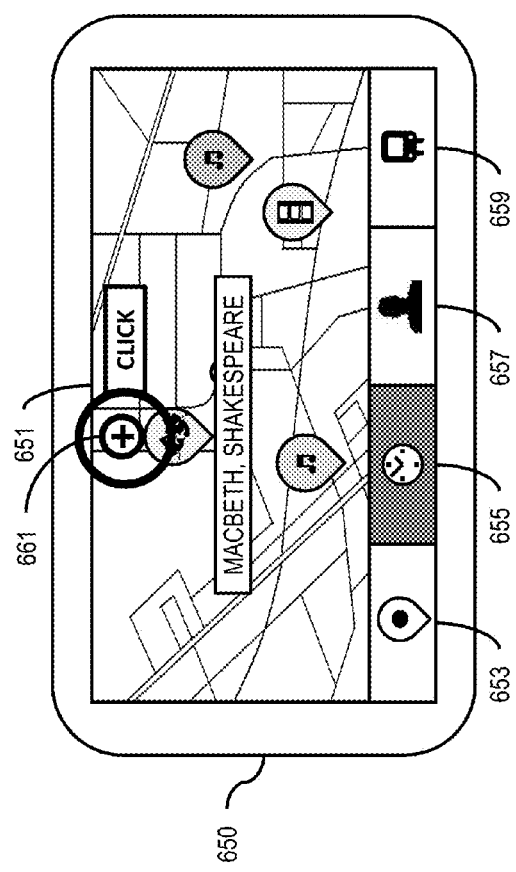
Figure 6D:
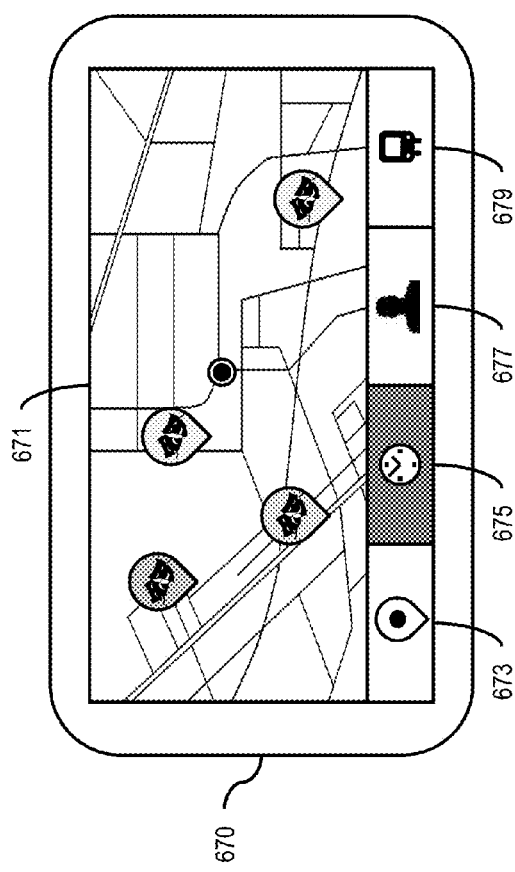

FIG. 6C illustrates a user interface 650 that features a display 651, options 653, 655, 657, and 659, a user interface object 661, and icons representing various events near the user. As shown, based on the selection of the drama icon in FIG. 6B, the name of the selected play (e.g., "Macbeth, Shakespeare") is displayed. Moreover, the selection of the drama icon in FIG. 6B, has also caused the user interface object 661 (e.g., plus symbol) to be presented next to the previously selected drama icon. Furthermore, as demonstrated, the user interface object 661 has been selected. FIG. 6D illustrates a user interface 670 that features a display 671, options 673, 675, 677, and 679, and icons representing various plays near the user. As shown, based on the selection of the user interface object 661 in FIG. 6C, drama icons representing several other plays near the user are presented.

Figure 7A:
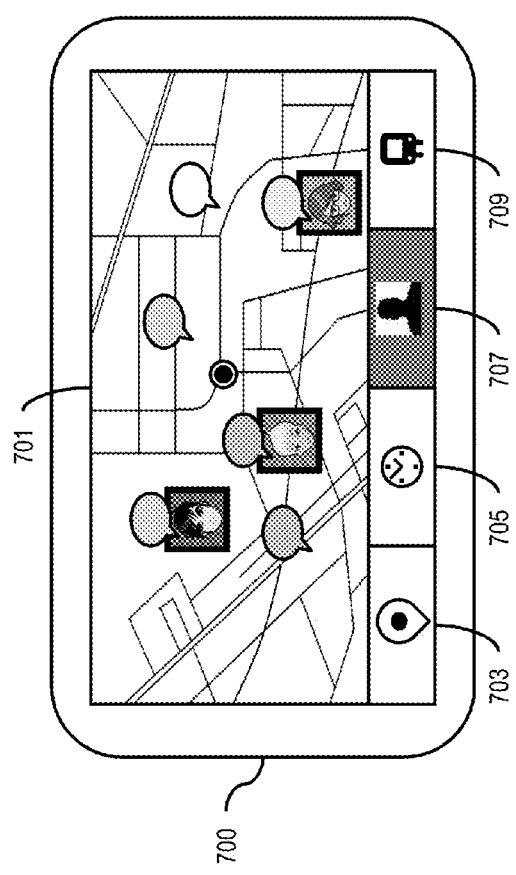
Figure 7B:
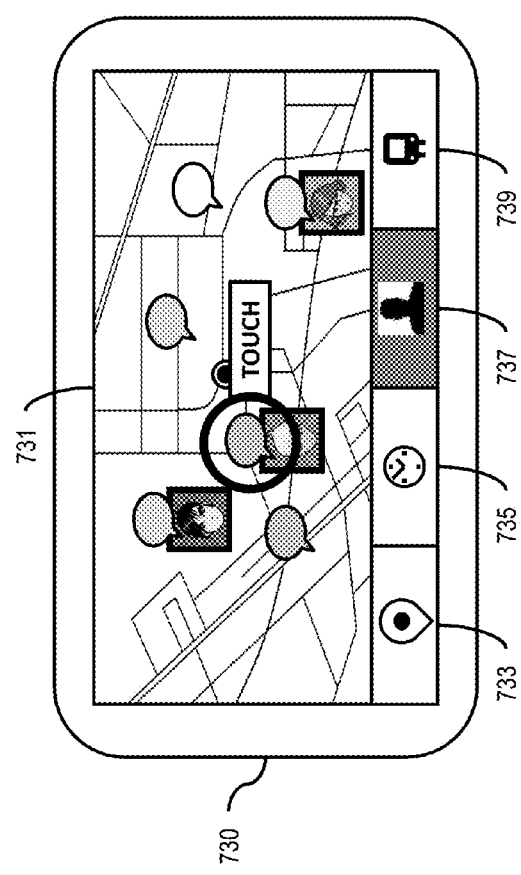

FIGS. 7A-7D are diagrams of user interfaces utilized to discover similar feeds in the processes of FIGS. 3 and 4, according to various embodiments. FIG. 7A illustrates a user interface 700 that features a display 701, options 703, 705, 707, and 709, and icons representing various social feeds associated with locations near the user. As shown, option 707 has been selected to indicate that the user wishes to be presented with social feed results. In addition, the various icons include indicators that may, for instance, demonstrate an age associated with respective social feeds (e.g., more recent social feeds have icons with lighter shades). FIG. 7B illustrates a user interface 730 that features a display 731, options 733, 735, 737, and 739, and icons representing various social feeds associated with locations near the user. As shown, a message icon representing a social feed from a particular user has been selected (e.g., touched by the user).

FIG. 7C illustrates a user interface 750 that features a display 751, options 753, 755, 757, and 759, a user interface object 761, and icons representing various social feeds associated with locations near the user. As shown, based on the selection of the message icon in FIG. 7B, the message associated with the selected social feed along and the associated author (e.g., Sarah) are displayed. Moreover, the selection of the message icon in FIG. 7B, has also caused the user interface object 761 (e.g., plus symbol) to be presented next to the previously selected message icon. Furthermore, as demonstrated, the user interface object 761 has been selected. FIG. 7D illustrates a user interface 770 that features a display 771, options 773, 775, 777, and 779, and icons representing various social feeds associated with locations near the user. As shown, based on the selection of the user interface object 761 in FIG. 7C, message icons representing several nearby social feeds similar to the selected social feed are presented.

The processes described herein for discovering similar content or search results may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 8:
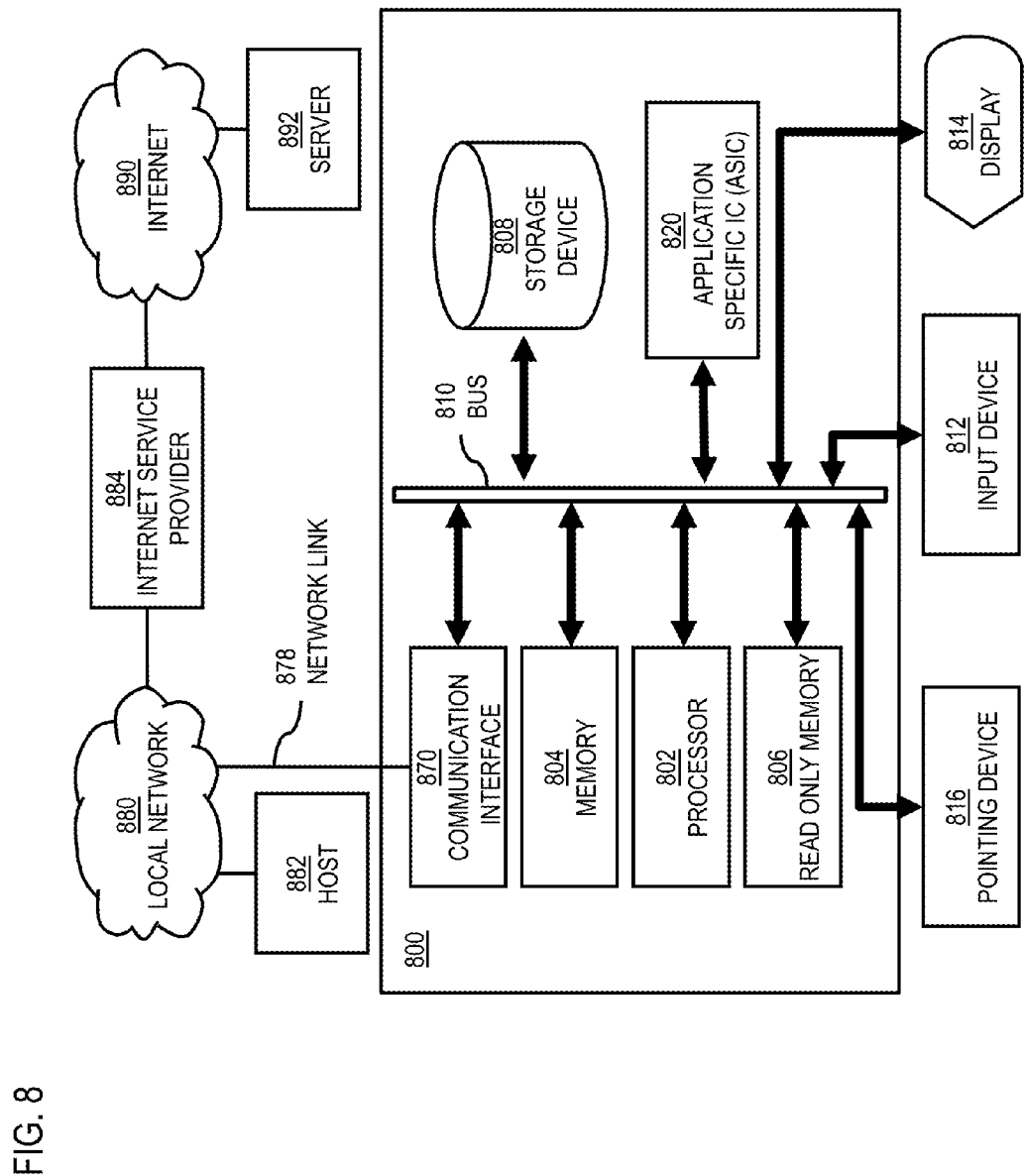
FIG. 8 is a diagram of hardware that can be used to implement an embodiment of the invention.

FIG. 8 illustrates a computer system 800 upon which an embodiment of the invention may be implemented. Although computer system 800 is depicted with respect to a particular device or equipment, it is contemplated that other devices or equipment (e.g., network elements, servers, etc.) within FIG. 8 can deploy the illustrated hardware and components of system 800. Computer system 800 is programmed (e.g., via computer program code or instructions) to discover similar content or search results as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 800, or a portion thereof, constitutes a means for performing one or more steps of discovering similar content or search results.

A bus 810 includes one or more parallel conductors of information so that information is transferred quickly among devices coupled to the bus 810. One or more processors 802 for processing information are coupled with the bus 810.

A processor (or multiple processors) 802 performs a set of operations on information as specified by computer program code related to discovering similar content or search results The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 800 also includes a memory 804 coupled to bus 810. The memory 804, such as a random access memory (RAM) or any other dynamic storage device, stores information including processor instructions for discovering similar content or search results. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or any other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for discovering similar content or search results, is provided to the bus 810 for use by the processor from an external input device 812, such as a keyboard containing alphanumeric keys operated by a human user, a microphone, an Infrared (IR) remote control, a joystick, a game pad, a stylus pen, a tough screen, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT), a liquid crystal display (LCD), a light emitting diode (LED) display, an organic LED (OLED) display, a plasma screen, or a printer for presenting text or images, and a pointing device 816, such as a mouse, a trackball, cursor direction keys, or a motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814 and pointing device 816 is omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of ASICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners and external disks. In general the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic or electromagnetic signals, including infrared and optical signals, that carry information streams, such as digital data. For example, in wireless handheld devices, such as mobile telephones like cell phones, the communications interface 870 includes a radio band electromagnetic transmitter and receiver called a radio transceiver. In certain embodiments, the communications interface 870 enables connection to the communication network 105 for discovering similar content or search results to the UE 101.

The term "computer-readable medium" as used herein refers to any medium that participates in providing information to processor 802, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 808. Volatile media include, for example, dynamic memory 804. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 820.

Network link 878 typically provides information communication using transmission media through one or more networks to other devices that use or process the information. For example, network link 878 may provide a connection through local network 880 to a host computer 882 or to equipment 884 operated by an Internet Service Provider (ISP). ISP equipment 884 in turn provides data communication services through the public, world-wide packet-switching communication network of networks now commonly referred to as the Internet 890.

A computer called a server host 892 connected to the Internet hosts a process that provides a service in response to information received over the Internet. For example, server host 892 hosts a process that provides information representing video data for presentation at display 814. It is contemplated that the components of system 800 can be deployed in various configurations within other computer systems, e.g., host 882 and server 892.

At least some embodiments of the invention are related to the use of computer system 800 for implementing some or all of the techniques described herein. According to one embodiment of the invention, those techniques are performed by computer system 800 in response to processor 802 executing one or more sequences of one or more processor instructions contained in memory 804. Such instructions, also called computer instructions, software and program code, may be read into memory 804 from another computer-readable medium such as storage device 808 or network link 878. Execution of the sequences of instructions contained in memory 804 causes processor 802 to perform one or more of the method steps described herein. In alternative embodiments, hardware, such as ASIC 820, may be used in place of or in combination with software to implement the invention. Thus, embodiments of the invention are not limited to any specific combination of hardware and software, unless otherwise explicitly stated herein.

The signals transmitted over network link 878 and other networks through communications interface 870, carry information to and from computer system 800. Computer system 800 can send and receive information, including program code, through the networks 880, 890 among others, through network link 878 and communications interface 870. In an example using the Internet 890, a server host 892 transmits program code for a particular application, requested by a message sent from computer 800, through Internet 890, ISP equipment 884, local network 880 and communications interface 870. The received code may be executed by processor 802 as it is received, or may be stored in memory 804 or in storage device 808 or any other non-volatile storage for later execution, or both. In this manner, computer system 800 may obtain application program code in the form of signals on a carrier wave.

Various forms of computer readable media may be involved in carrying one or more sequence of instructions or data or both to processor 802 for execution. For example, instructions and data may initially be carried on a magnetic disk of a remote computer such as host 882. The remote computer loads the instructions and data into its dynamic memory and sends the instructions and data over a telephone line using a modem. A modem local to the computer system 800 receives the instructions and data on a telephone line and uses an infra-red transmitter to convert the instructions and data to a signal on an infra-red carrier wave serving as the network link 878. An infrared detector serving as communications interface 870 receives the instructions and data carried in the infrared signal and places information representing the instructions and data onto bus 810. Bus 810 carries the information to memory 804 from which processor 802 retrieves and executes the instructions using some of the data sent with the instructions. The instructions and data received in memory 804 may optionally be stored on storage device 808, either before or after execution by the processor 802.

FIG. 9 illustrates a chip set or chip 900 upon which an embodiment of the invention may be implemented. Chip set 900 is programmed to discover similar content or search results as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 900 can be implemented in a single chip. It is further contemplated that in certain embodiments the chip set or chip 900 can be implemented as a single "system on a chip." It is further contemplated that in certain embodiments a separate ASIC would not be used, for example, and that all relevant functions as disclosed herein would be performed by a processor or processors. Chip set or chip 900, or a portion thereof, constitutes a means for performing one or more steps of providing user interface navigation information associated with the availability of functions. Chip set or chip 900, or a portion thereof, constitutes a means for performing one or more steps of discovering similar content or search results.

In one embodiment, the chip set or chip 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 900 includes merely one or more processors and some software and/or firmware supporting and/or relating to and/or for the one or more processors.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to discover similar content or search results. The memory 905 also stores the data associated with or generated by the execution of the inventive steps.

Figure 10:
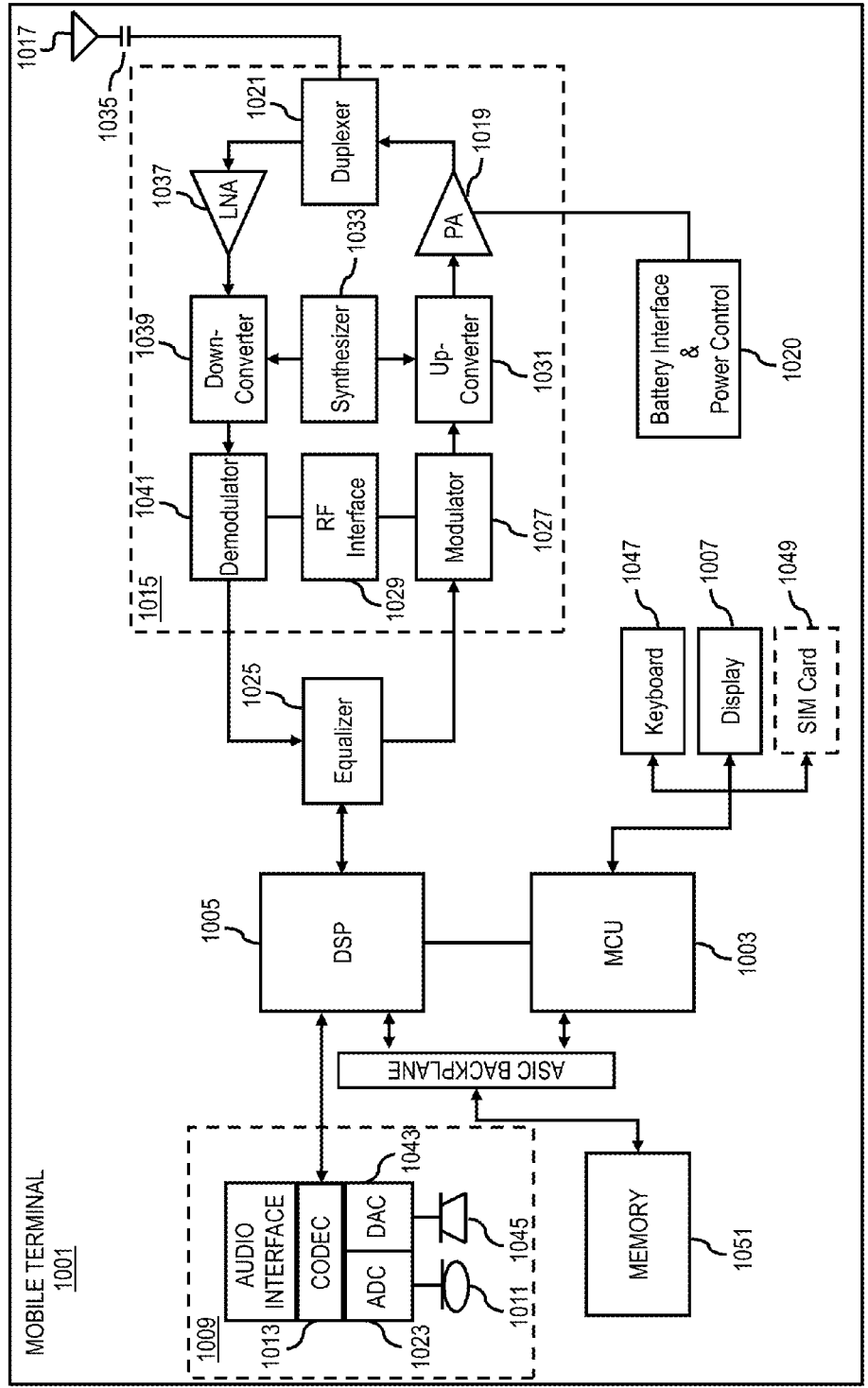
FIG. 10 is a diagram of a mobile terminal (e.g., handset) that can be used to implement an embodiment of the invention.

FIG. 10 is a diagram of exemplary components of a mobile terminal (e.g., handset) for communications, which is capable of operating in the system of FIG. 1, according to one embodiment. In some embodiments, mobile terminal 1001, or a portion thereof, constitutes a means for performing one or more steps of discovering similar content or search results. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile terminal functions that perform or support the steps of discovering similar content or search results. The display 1007 includes display circuitry configured to display at least a portion of a user interface of the mobile terminal (e.g., mobile telephone). Additionally, the display 1007 and display circuitry are configured to facilitate user control of at least some functions of the mobile terminal. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile terminal 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003 which can be implemented as a Central Processing Unit (CPU) (not shown).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile terminal 1001 to discover similar content or search results. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the terminal. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile terminal 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable storage medium known in the art. The memory device 1051 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1049 carries, for instance, important information, such as the cellular phone number, the carrier supplying service, subscription details, and security information. The SIM card 1049 serves primarily to identify the mobile terminal 1001 on a radio network. The card 1049 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:

initiating a presentation, on a user interface of a device, of a plurality of categories simultaneously in conjunction with a map, wherein the plurality of categories include at least a point of interest category, a current event category, and a social feed category, wherein point of interest items of the point of interest category, current event items of the current event category, and social feed items of the of the social feed category are presented with graphic indicators of a different shape per category and an identical shape within each of the plurality of categories;

receiving a first input at the user interface selecting one of the plurality of categories, wherein the first input is made by selecting a point of interest button, a current event button, or a social feed button concurrently presented on the user interface;

initiating a presentation of one or more results of the first input on the map, wherein the one or more results include graphical indicators of the selected category presented at different locations in the map and shaded differently based on how recent items corresponding to the graphical indicators of the selected category are;

receiving a second input selecting one of the graphical indicators of the selected category on the map;

initiating a presentation of a graphic symbol next to the selected graphical indicator on the map;

receiving a third input selecting the graphic symbol and determining one or more criteria associated with the selected graphical indicator, wherein the one or more criteria include one subcategory of the selected category; and initiating a presentation of some of the graphical indicators each corresponding to the subcategory on the user interface while omitting therefrom other ones of the graphical indicators of the selected category.

2. The method of claim 1, wherein when the social feed button is selected, at least one of the graphical indicators of the social feed category is displayed together with a user image associated with the at least one graphical indicator of the social feed category.

3. The method of claim 2, further comprising:
initiating a presentation of a feed box corresponding to a social feed upon user selection of one of the graphical indicators of the social feed which subcategory is used as a social feed subcategory, wherein the feed box displays a user image and a message associated with the social feed.

4. The method of claim 1, wherein the presentation of the some graphical indicators includes the graphical indicators of the subcategory shaded differently based on how recent items corresponding to the graphical indicators of the subcategory are, and wherein the one or more results, the graphical indicators of the selected category, the graphical indicators of the subcategory, or a combination thereof are associated with one or more point of interest features, one or more social feed features, one or more news feed features, one or more current event features, or a combination thereof.

5. The method of claim 1, further comprising:
processing at least one data set to determine a hierarchy of results,
wherein the one or more results, the graphical indicators, or a combination thereof are based, at least in part, on the hierarchy.

6. The method of claim 1, wherein the plurality of categories further include a news feed category, an advertisement category, a recommendation category, or a combination thereof, and the method further comprising:
changing the graphical indicators of the selected category to be shaded based, at least in part, on different timing statuses or different user ratings of the items corresponding to the graphical indicators of the selected category.

7. The method of claim 6, wherein the timing statuses include a start time, an end time, or a combination thereof associated with the graphical indicators of the selected category.

8. The method of claim 1, further comprising:
determining a history associated with one or more users, wherein the history includes, at least in part, one or more previous selections of the at least one user interface object, the at least one of the one or more results, at least one of the graphical indicators, or a combination thereof, and
wherein the one or more results, the graphical indicators, or a combination thereof are based, at least in part, on the history.

9. The method of claim 7, further comprising:
determining context information associated with the device, a user of the device, or a combination thereof,
wherein the one or more results, the graphical indicators, or a combination thereof are based, at least in part, on the context information.

10. The method of claim 7, wherein the criteria include one or more social feed types each of which is associated with an identified user or content.

11. The method of claim 10, wherein the user interface is a location-based display and the location-based display is an augmented reality display, a mixed reality display, a virtual reality display, a navigation display, or a combination thereof.

12. An apparatus comprising:
at least one processor; and
at least one memory including computer program code for one or more programs,
the at least one memory and the computer program code configured to, with the at least one processor, cause the apparatus to perform at least the following:
initiate a presentation, on an user interface of a device, of a plurality of categories simultaneously in conjunction with a map, wherein the plurality of categories include at least a point of interest category, a current event category, and a social feed category, wherein point of interest items of the point of interest category, current event items of the current event category, and social feed items of the of the social feed category are presented with graphic indicators of a different shape per category and an identical shape within each of the plurality of categories;
receive a first input at the user interface selecting one of the plurality of categories, wherein the first input is made by selecting a point of interest button, a current event button, or a social feed button concurrently presented on the user interface;
initiate a presentation of one or more results of the first input on the map, wherein the one or more results include graphical indicators of the selected category presented at different locations in the map and shaded differently based on how recent items corresponding to the graphical indicators of the selected category are;
receive a second input selecting one of the graphical indicators of the selected category on the map;
initiate a presentation of a graphic symbol next to the selected graphical indicator on the map;
receive a third input selecting the graphic symbol and determining one or more criteria associated with the selected graphical indicator, wherein the one or more criteria include one subcategory of the selected category; and
initiate a presentation of some of the graphical indicators each corresponding to the subcategory on the user interface while omitting therefrom other ones of the graphical indicators of the selected category.

13. The apparatus of claim 12, wherein when the social feed button is selected, at least one of the graphical indicators of the social feed category is displayed together with a user image associated with the at least one graphical indicator of the social feed category.

14. The apparatus of claim 13, wherein the apparatus is further caused to:
initiate a presentation of a feed box corresponding to a social feed upon user selection of one of the graphical indicators of the social feed which subcategory is used as a social feed subcategory, wherein the feed box displays a user image and a message associated with the social feed.

15. The apparatus of claim 12, wherein the plurality of categories further include a news feed category, an advertisement category, a recommendation category, or a combination thereof.

16. The apparatus of claim 12, wherein the apparatus is further caused to:

process at least one data set to determine a hierarchy of results, wherein the one or more results, the graphical indicators of the selected category, or a combination thereof are based, at least in part, on the hierarchy.

17. The apparatus of claim 12, wherein the apparatus is further caused to:

change the graphical indicators of the selected category to be shaded based, at least in part, on different timing statuses or different user ratings of the items corresponding to the graphical indicators of the selected category.

18. The apparatus of claim 17, wherein the timing statuses include a start time, an end time, or a combination thereof associated with the graphical indicators of the selected category.

19. The apparatus of claim 13, wherein the apparatus is further caused to:

determine a history associated with one or more users, wherein the history includes, at least in part, one or more previous selections of the at least one user interface object, the at least one of the one or more results, at least one of the graphical indicators of the selected category, or a combination thereof, and wherein the one or more results, the graphical indicators of the selected category, or a combination thereof are based, at least in part, on the history.

20. The apparatus of claim 12, wherein the apparatus is further caused to:

determine context information associated with the device, a user of the device, or a combination thereof, wherein the one or more results, the graphical indicators of the selected category, or a combination thereof are based, at least in part, on the context information.

* * * * *